US007256566B2

(12) United States Patent
Bhavaraju et al.

(10) Patent No.: US 7,256,566 B2
(45) Date of Patent: Aug. 14, 2007

(54) METHOD AND APPARATUS FOR DETERMINING A MAXIMUM POWER POINT OF PHOTOVOLTAIC CELLS

(75) Inventors: Vijay Bhavaraju, Canton, MI (US); Kerry E. Grand, Chesterfield, MI (US); Anil Tuladhar, Dearborn Heights, MI (US)

(73) Assignee: Ballard Power Systems Corporation, Dearborn, MI (US)

( * ) Notice: Subject to any disclaimer, the term of this patent is extended or adjusted under 35 U.S.C. 154(b) by 249 days.

(21) Appl. No.: 10/836,121

(22) Filed: Apr. 30, 2004

(65) Prior Publication Data

US 2004/0264225 A1 Dec. 30, 2004

(51) Int. Cl.
*H01M 10/44* (2006.01)
(52) U.S. Cl. .................................... 320/101
(58) Field of Classification Search ............... 320/101; 323/299; 363/65, 71, 72, 95, 98, 97, 131, 363/132; 307/DIG. 1
See application file for complete search history.

(56) References Cited

U.S. PATENT DOCUMENTS

| | | | | |
|---|---|---|---|---|
| 3,832,622 | A | * | 8/1974 | Compoly ..................... 363/72 |
| 4,171,517 | A | * | 10/1979 | Higa et al. .................. 327/154 |
| 4,661,897 | A |   | 4/1987 | Pitel ............................ 363/17 |
| 4,674,024 | A |   | 6/1987 | Paice et al. ................... 363/71 |
| 5,184,291 | A |   | 2/1993 | Crowe et al. ................. 363/37 |
| 5,268,832 | A | * | 12/1993 | Kandatsu ..................... 363/95 |
| 5,422,440 | A |   | 6/1995 | Palma ..................... 174/133 B |
| 5,459,356 | A |   | 10/1995 | Schulze et al. ............. 257/773 |
| 5,508,560 | A |   | 4/1996 | Koehler et al. ............. 257/730 |
| 5,604,430 | A | * | 2/1997 | Decker et al. .............. 323/275 |
| 5,745,356 | A | * | 4/1998 | Tassitino et al. .............. 363/71 |
| 5,838,148 | A | * | 11/1998 | Kurokami et al. .......... 323/299 |
| 5,867,011 | A | * | 2/1999 | Jo et al. ..................... 323/299 |
| 5,869,956 | A | * | 2/1999 | Nagao et al. ............... 323/299 |
| 5,883,797 | A | * | 3/1999 | Amaro et al. ................. 363/65 |
| 5,892,354 | A | * | 4/1999 | Nagao et al. ............... 323/299 |
| 5,923,100 | A | * | 7/1999 | Lukens et al. ................ 307/66 |
| 5,923,158 | A | * | 7/1999 | Kurokami et al. .......... 323/299 |
| 5,932,994 | A | * | 8/1999 | Jo et al. ..................... 323/222 |
| 6,046,919 | A | * | 4/2000 | Madenokouji et al. ........ 363/98 |
| 6,072,707 | A |   | 6/2000 | Hochgraf ..................... 363/71 |

(Continued)

FOREIGN PATENT DOCUMENTS

EP      0 427 143 A2    5/1991

(Continued)

OTHER PUBLICATIONS

Erickson et al., Electrical Engineering Theory and Practice, 2nd edition, 1967, p. 7.*

(Continued)

*Primary Examiner*—Pia Tibbits

(57) ABSTRACT

The maximum power point (MPP) of a photovoltaic array that can be coupled to power inverter is determined. A capacitor on a DC-bus side of the inverter is used as a load from which I-V characteristics of the photovoltaic array can be generated. The photovoltaic array is connected to the capacitor, which has been previously discharged by a bleed down resistor. Short circuit current, open circuit voltage, and values of current and voltage as the capacitor charges are determined and used to generate I-V characteristics of the photovoltaic array. From the I-V characteristics, the MPP can be calculated.

26 Claims, 3 Drawing Sheets

U.S. PATENT DOCUMENTS

| | | | | |
|---|---|---|---|---|
| 6,078,173 | A | 6/2000 | Kumar et al. | 324/158.1 |
| 6,111,767 | A * | 8/2000 | Handleman | 363/95 |
| 6,118,680 | A * | 9/2000 | Wallace et al. | 363/71 |
| 6,212,087 | B1 | 4/2001 | Grant et al. | 363/144 |
| 6,239,997 | B1 * | 5/2001 | Deng | 363/95 |
| 6,339,538 | B1 * | 1/2002 | Handleman | 363/95 |
| 6,809,942 | B2 * | 10/2004 | Madenokouji et al. | 363/98 |
| 2002/0034088 | A1 | 3/2002 | Parkhill et al. | 363/144 |
| 2002/0118560 | A1 | 8/2002 | Ahmed et al. | 363/144 |
| 2002/0167828 | A1 | 11/2002 | Parkhill et al. | 363/144 |

FOREIGN PATENT DOCUMENTS

| | | | |
|---|---|---|---|
| EP | 0 578 108 A1 | | 1/1994 |
| EP | 947905 | * | 10/1999 |
| EP | 1271742 | * | 1/2003 |
| JP | 07064660 | * | 3/1995 |
| JP | 07072941 | * | 3/1995 |
| JP | 10117440 | * | 5/1998 |
| JP | 2001309561 | * | 11/2001 |

OTHER PUBLICATIONS

Kasa et al., "MPPT with capacitor identifier for photovoltaic power system", IEE Proc.-Electr. Power Appl., vol. 147, Nov. 2000, pp. 497-502.*

Kasa et al., "Robust Control for MPPT in photovoltaic power system", IEEE, 2002, pp. 827-832.*

Ho et al., "An integrated inverter with MPPT for grid-connected PV systems", IEEE, 2004, PP. 1559-1565.*

Chung et al., "A novel MPPT Technique for solar panels using a Sepic or Cuk converter", IEEE, 2003, pp. 717-724.*

Applebaum, J., "The Quality of Load Matching in a Direct-coupling Photovoltaic System," *IEEE Transactions on Energy Conversion EC-2*(4):534-541, Dec. 1987.

Braunstein, A., et al., "On the Dynamic Optimal Coupling of a Solar Cell Array to a Load and Storage Batteries," *IEEE Transactions on Power Apparatus and Systems PAS- 100*(3):1183-1187, Mar. 1981.

Hussein, K., et al., "Maximum Photovoltaic Power Tracking: An Algorithm for Rapidly Changing Atmospheric Conditions," *IEE Proc.-Gener. Transm. Distrib. 142*(1):59-64, Jan. 1995.

Kislovski, A., et al., "Maximum-Power-Tracking Using Positive Feedback," in *Proceedings of the IEEE Power Electron. Spec. Conference*, 1994, pp. 1065-1068.

U.S. Appl. No. 60/467,332, filed May 2, 2003, Deng et al.

U.S. Appl. No. 60/470,321, filed May 12, 2003, Deng et al.

Mohan et al., *Power Electronics: Converters, Applications and Designs*, John Wiley & Sons Inc., USA, 1989, Chapter 26-8, "Circuit Layout," p. 654.

Nafeh, A., et al., "Microprocessor Control System for Maximum Power Operation of PV Arrays," *Intl. Journal of Num. Model. 12*:187-195, 1999.

Sugimoto, H., et al., "A New Scheme for Maximum Photovoltaic Power Tracking Control," in *Proceedings of the Power Conversion Conference*, Nagaoka, 1997, vol. 2, pp. 691-696.

Tse, K., et al., "A Novel Maximum Power Point Tracker for PV Panels Using Switching Frequency Modulation," *IEEE Transactions on Power Electronics 17*(6):980-989, Nov. 2002.

Wolf, S., et al., "Economical, PV Maximum Power Point Tracking Regulator with Simplistic Controller," in *Proceedings of the IEEE Power Electron. Spec. Conference*, 1993, pp. 581-587.

* cited by examiner

METHOD AND APPARATUS FOR DETERMINING A MAXIMUM POWER POINT OF PHOTOVOLTAIC CELLS

TECHNICAL FIELD

The present disclosure is generally related to photovoltaic cells, and particularly but not exclusively to photovoltaic cells used in conjunction with power inverters.

BACKGROUND INFORMATION

A photovoltaic cell is one of the cleanest and environment-friendly non-conventional energy sources. A photovoltaic cell directly converts solar energy into electrical energy. The electrical energy produced by the photovoltaic cell can be extracted over time and used in the form of electric power. This electric power can be used to drive electric devices. Typically, the power is extracted by use of DC-DC up/down converter circuitry and/or DC/AC inverter circuitry.

The popularity of photovoltaic energy generation is rapidly increasing worldwide. One reason for such popularity is that the energy produced by photovoltaic energy generation is essentially pollution free, unlike conventional energy sources, such as fossil fuel burning thermal power plants, nuclear reactors, and hydroelectric plants, which all raise environmental issues. However, there are difficulties encountered with photovoltaic energy generation that are not present in conventional energy generation systems. These issues include the peculiar current-voltage (IV) droop characteristics of photovoltaic cells, the cost, and the relatively low energy density (efficiency) of photovoltaic cells.

The peculiar IV droop characteristics of photovoltaic cell arrays cause the output power to change nonlinearly with the current drawn from photovoltaic cells. While there may be different types of photovoltaic cells (such as amorphous, crystalline, and other types of photovoltaic cells), all types of photovoltaic arrays show nonlinear power-voltage curves. Furthermore, beyond the fact that the power-voltage curves are different for different types of photovoltaic arrays, the power-voltage curve changes for different radiation levels and temperatures of operation for any given photovoltaic array. Other factors may also contribute to the differences in the power-voltage curves for different types of photovoltaic arrays, as well as to the differences in the power-voltage curve for any given photovoltaic array under different operating or installation conditions.

The near optimal point at which to operate photovoltaic arrays is at or near the region of the power-voltage curves where power is greatest. This point is denominated as the Maximum Power Point (MPP). Photovoltaic cells are still relatively expensive and have relatively low energy densities, and so a wide area is required to generate sizable power. Hence, it is important to operate the photovoltaic cells around the MPP to optimize efficiency.

Techniques exist to at least estimate the MPP for any given photovoltaic array. However, such determination of the MPP is generally performed by a manufacturer (and/or by different agencies or organizations) under certain carefully controlled conditions of temperature, light density, incident angle of the light on the photovoltaic array, wind speed, and other factors that can influence the MPP. Moreover, complicated sensors or other equipment may be needed by the manufacturer to determine the MPP.

Installers, in comparison, do not have the luxury of controlled conditions and complicated equipment when installing a photovoltaic array into a system, and for determining whether the photovoltaic array has been installed or is operating properly near the MPP. The installer generally needs to rely on the MPP data provided by the manufacturer in order to estimate the MPP, and then to tune the system to operate the photovoltaic array near the MPP. This, of course, can lead to inefficient operation of the photovoltaic array, since the environmental (or climatic) conditions, installation conditions, and other actual conditions observed by the installer can change from one point in time to another and since the manufacturer's data generally does not provide the MPP for all possible variations and permutations in such conditions.

BRIEF SUMMARY OF THE INVENTION

In one aspect, a method for determining a maximum power point (MPP) of a photovoltaic array coupleable to a power inverter by way of a DC bus comprising a capacitor coupled across the DC bus and a switch positioned between the photovoltaic array and the inverter comprises closing the switch and obtaining a maximum value of a current provided by the photovoltaic array substantially to the capacitor in response to the closing of the switch. The current charges the capacitor to progressively increase a voltage of the capacitor while the current decreases from the maximum value. Values of the current and voltage while the capacitor is charging are obtained. A value of the voltage after the capacitor is charged is also obtained. The method uses the obtained maximum value of the current, the values of the current and voltage while the capacitor is charging, and the value of the voltage after the capacitor is charged to generate I-V characteristics of the photovoltaic array. The MPP of the photovoltaic array is determined from the generated I-V characteristics.

In another aspect, a method of determining a maximum power point (MPP) of an energy source comprises determining current and voltage values associated with a capacitor under short circuit and open circuit conditions. Current and voltage values associated with the capacitor while a charging state of the capacitor is changing are determined, and the determined current and voltage values are used to determine the MPP of the energy source.

In another aspect, an article of manufacture usable with a photovoltaic array, comprising at least one photovoltaic cell, coupleable to a power inverter by way of a DC bus comprising a capacitor coupled across the DC bus and a switch positioned between the photovoltaic array and an AC bus of the inverter comprises a machine-readable medium. The machine-readable medium comprises instructions stored thereon to cause a processor to determine a maximum power point (MPP) associated with the photovoltaic array, by: obtaining a maximum value of a current provided by the photovoltaic array substantially to the capacitor in response to a closing of the switch in a short circuit condition, the current charging the capacitor to progressively increase a voltage of the capacitor while the current decreases from the maximum value; obtaining values of the current and the voltage while the capacitor is charging; obtaining a value of the voltage in an open circuit condition after the capacitor is charged; using at least some of the obtained values of the current and the voltage to generate I-V characteristics of the photovoltaic array; and determining the MPP of the photovoltaic array from the generated I-V characteristics.

In another aspect, a system comprises a means for determining current and voltage values associated with a capacitor under short circuit and open circuit conditions, a means for determining current and voltage values associated with the capacitor associated with a charging state of the capacitor, and a means for using the determined current and voltage values to determine a maximum power point (MPP) of a photovoltaic source.

In yet another aspect, a system comprises a photovoltaic array comprising at least one photovoltaic cell. An inverter inverts DC power from the photovoltaic array into AC power. A DC bus couples the photovoltaic array to the inverter. A capacitor is coupled across the DC bus. A current sensor is coupled to the DC bus to determine current associated with the photovoltaic array. A voltage sensor is coupled to the DC bus to determine voltage associated with the photovoltaic array. A controller determines a maximum power point (MPP) of the photovoltaic array based at least in part on current and voltage values respectively provided by the current sensor and the voltage sensor, the current and voltage values representing I-V characteristics of the photovoltaic array with the capacitor as a load.

In yet another aspect, an apparatus comprises a current sensor to determine current from a photovoltaic array, comprising at least one photovoltaic cell, during at least short circuit, open circuit, and capacitor-charging conditions. A voltage sensor determines voltage from the photovoltaic array during the open circuit and capacitor-charging conditions. A processor determines a maximum power point (MPP) associated with the photovoltaic array by using the determined currents and voltages to directly determine I-V characteristics of the photovoltaic array and to use the I-V characteristics to identify the MPP.

BRIEF DESCRIPTION OF THE SEVERAL VIEWS OF THE DRAWINGS

Non-limiting and non-exhaustive embodiments are described with reference to the following figures. In the figures, identical reference numbers identify similar elements or acts. The sizes and relative positions of elements in the figures are not necessarily drawn to scale. For example, the shapes of various elements and angles are not drawn to scale, and some of these elements are arbitrarily enlarged and positioned to improve drawing legibility. Further, the particular shapes of the elements as drawn are not intended to convey any information regarding the actual shape of the particular elements, and have been solely selected for ease of recognition in the figures.

DETAILED DESCRIPTION

Figure 1:
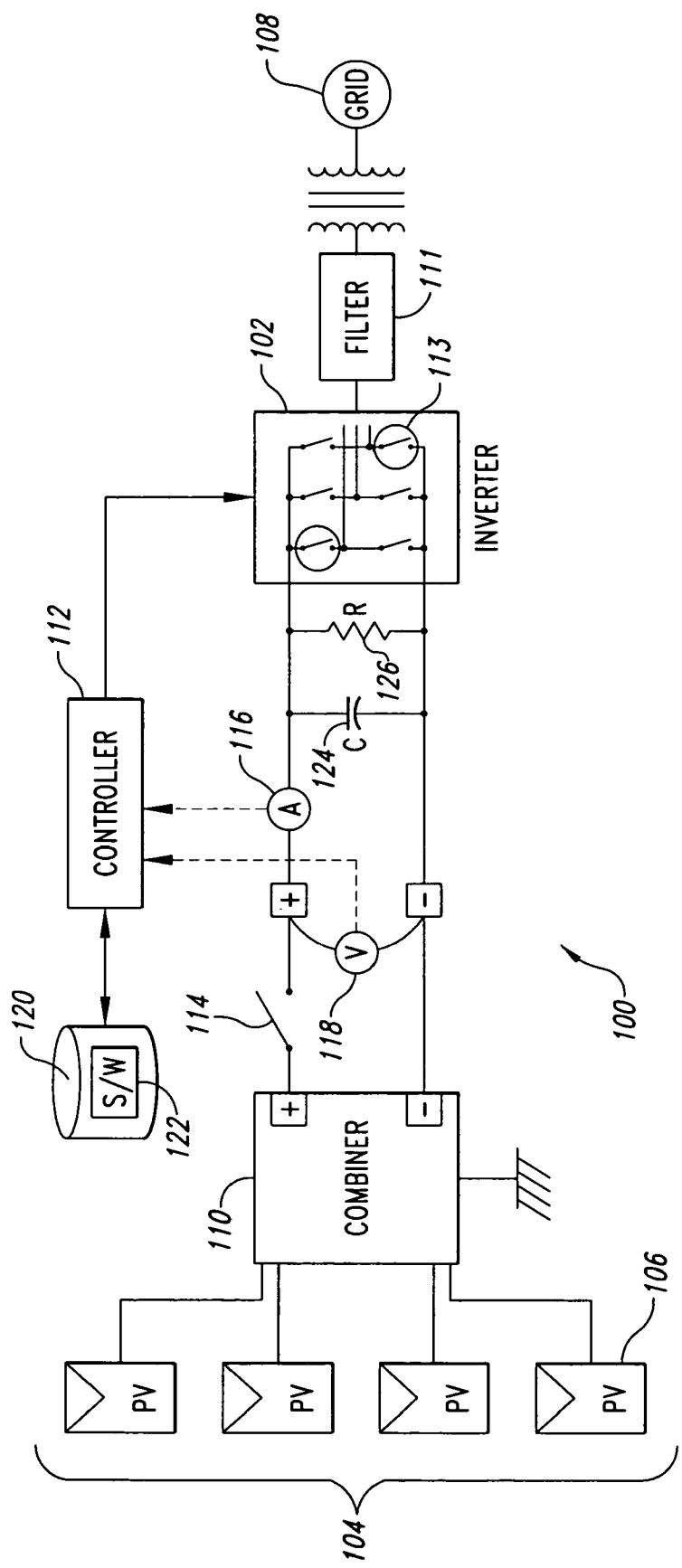
FIG. 1 is a schematic block diagram of a system in which an MPP can be determined in accordance with an embodiment.

In the following description, certain specific details are set forth in order to provide a thorough understanding of various embodiments. However, one skilled in the art will understand that present systems and methods may be practiced without these details. In other instances, well-known structures associated with photovoltaic arrays, inverters and processors or controllers have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Further more, the particular features, structures, or characteristics may be combined in any suitable manner in one or more embodiments.

The headings provided herein are for convenience only and do not interpret the scope or meaning of the claimed invention.

As an overview, an embodiment determines the MPP of a photovoltaic array that can be coupled to an inverter. The embodiment uses one or more capacitors on a DC-bus side of the inverter as a load from which I-V characteristics of the array can be generated. One or more bleed down resistors is coupled to the capacitor. When the photovoltaic array is disconnected from the inverter, the bleed down resistor discharges the capacitor to zero volts. The photovoltaic array is charged, and then after being fully charged, the photovoltaic array is connected to the discharged capacitor. The photovoltaic array, behaving like a current source, outputs a maximum current after the connection is made. This is a "short circuit current," wherein the capacitor behaves as a short circuit and absorbs substantially all of the current output from the photovoltaic array, and thus begins charging from zero volts to its fully charged voltage. As the capacitor charges, the output current from the photovoltaic array decreases from the value of the short circuit current, until the output current become zero and the capacitor is fully charged to an "open circuit voltage."

A current sensor and a voltage sensor may be used to determine these currents and voltages. From these determined currents and voltages, the I-V characteristics of the photovoltaic array can be generated. Such I-V characteristics are based on actual conditions of the photovoltaic array, climatic conditions, and conditions that depend on the installation. From the I-V characteristics, the available power from the photovoltaic array can be calculated across several voltages (ranging between zero volts and the open circuit voltage). The MPP is determined from value of the current and the value of the voltage that results in the maximum power, which may be accomplished via calculation performed by software in an embodiment.

FIG. 1 shows an embodiment of a system 100 wherein the MPP determination techniques described herein may be implemented. An inverter 102 contains circuitry and/or logic appropriate to extract DC power from a photovoltaic array 104 comprising one or more photovoltaic cells 106 (four cells being shown in FIG. 1 as an example), invert the extracted DC power to AC power, and export the AC power to an AC power grid 108 or other load. The inverter 102 of one embodiment comprises a plurality of switches 113, such as six insulated gate bipolar transistors (IGBTS) that comprise pairs of switches for a 3-phase inverter. In one embodiment, the inverter 102 comprises a voltage source inverter working in current control mode. One possible example embodiment of the inverter 102 is described in U.S. patent application Ser. No. 10/447,708, entitled "METHOD AND APPARATUS FOR MEASURING FAULT DIAGNOS- TICS ON INSULATED GATE BIPOLAR TRANSISTOR CONVERTER CIRCUITS," filed May 28, 2003, assigned to the same assignee as the present application, and incorporated herein by reference in its entirety. Other example embodiments for the inverter 102 are disclosed in other issued patents and published applications owned by the assignee of the present application.

Other components in the system 100 comprise a combiner 110 to electrically couple individual photovoltaic cells 106 in series ("a string") and/or in parallel so as to provide an appropriate DC voltage level to the inverter 102. A controller 112 is coupled to the inverter 102 to control operation of the inverter 102. The system 100 may also further comprise a line filter 111 on an AC-bus side of the inverter 102, as well as other components that are not shown or described herein in detail, for the purpose of brevity.

On a DC-bus side of the inverter 102, the system 100 comprises a switch 114 that can be used to connect and disconnect the photovoltaic array 104 to the inverter 102. For example, the switch 114 may be open to disconnect the photovoltaic array 104 from the inverter 102 when the photovoltaic array 104 is charging. The switch 114 may be closed to connect the photovoltaic array 104 to the inverter 102 when the photovoltaic array 104 has been fully charged and is ready to provide DC power to the inverter 102 and/or when the MPP is to be determined, as will be described below.

The DC-bus side of the inverter 102 can further comprise or have coupleable thereto a current sensor 116 to measure or otherwise determine output current from the photovoltaic array 104, and a voltage sensor 118 to measure or otherwise determine output voltage from the photovoltaic array 104. While the particular embodiment of FIG. 1 is shown and described herein in the context of the current sensor 116 and the voltage sensor 118 respectively measuring or otherwise determining current and voltage for the entire photovoltaic array 104, it is appreciated that individual current and voltage sensors may be provided to measure or otherwise determine separate currents and voltages from individual or groups of photovoltaic cells 106.

In an embodiment, the current sensor 116 and the voltage sensor 118 are coupled to the controller 112, which is symbolically shown in FIG. 1 by broken lines. Such coupling allows the controller 112 to receive the current and voltage readings from these sensors, and to generate I-V characteristics therefrom. In an embodiment, the controller 112 is coupled to a machine-readable storage medium 120 that has software 122 or other machine-readable instructions stored thereon. The controller 112 can operate in conjunction with the software 122 to generate the I-V characteristics as values in a data structure, a graph, variables having values, or other type of data representation. In an embodiment, the controller 112 can operate in conjunction with the software 122 to calculate power available from the photovoltaic array 104 (including the power at the MPP), such as by multiplying values of the measured current and voltage from the I-V characteristics. Once the MPP is determined, the controller 112 (and/or the installer or user) can set the inverter 102 to operate at the voltage and current corresponding to the MPP.

While the controller 112 is shown and described herein as the same component that is involved with both MPP determination and control of the inverter 102, it is appreciated that separate controllers may be provided. For example, a tester unit to determine the MPP need not necessarily be integrated with the inverter 102 and other parts of the system 100. Such a tester unit can comprise its own controller 112 or other processor that operates in conjunction with software 122. The installer or user can connect the tester unit to the current sensor 116 and to the voltage sensor 118 (or the current sensor 116 and the voltage sensor 118 may comprise part of the tester unit itself) to obtain values of current and voltage, and then calculate power therefrom. Once the MPP is determined from the tester unit, the installer or user can make the appropriate adjustments to the controller 112 or other components of the system 100 to ensure that the system 100 operates at or near the MPP.

In an embodiment, the current sensor 116 and the voltage sensor 118 read values of current and voltage, respectively, across one or more capacitors 124 coupled across the DC-bus side of the inverter 102. The capacitor 124 is designed to reduce ripple on the photovoltaic array 104, which may be caused by unbalanced conditions at the grid 108. However, according to an embodiment, the capacitor 124 is used as a load for generating the I-V characteristics of the photovoltaic array, as will be described further below. An example value of the capacitor 124 is 12,000 microFarads, although it is to be appreciated that the capacitance of the capacitor 124 may be different from one system 100 to another and based on the particular application.

In an embodiment, the DC-side bus of the inverter 102 further comprises a bleed down resistor 126 coupled in parallel to the capacitor 124. The resistor 126 operates to discharge the capacitor 124 when the switch 114 is opened. For example, if the installer wishes to make several calculations of the MPP, the capacitor 124 is discharged via the resistor 126 before measurements of current and voltage are made. An example value of the resistor 126 is 30 k ohms, and it is appreciated that this resistance value is merely illustrative and can vary from one system to another and based on the particular application.

Figure 2:
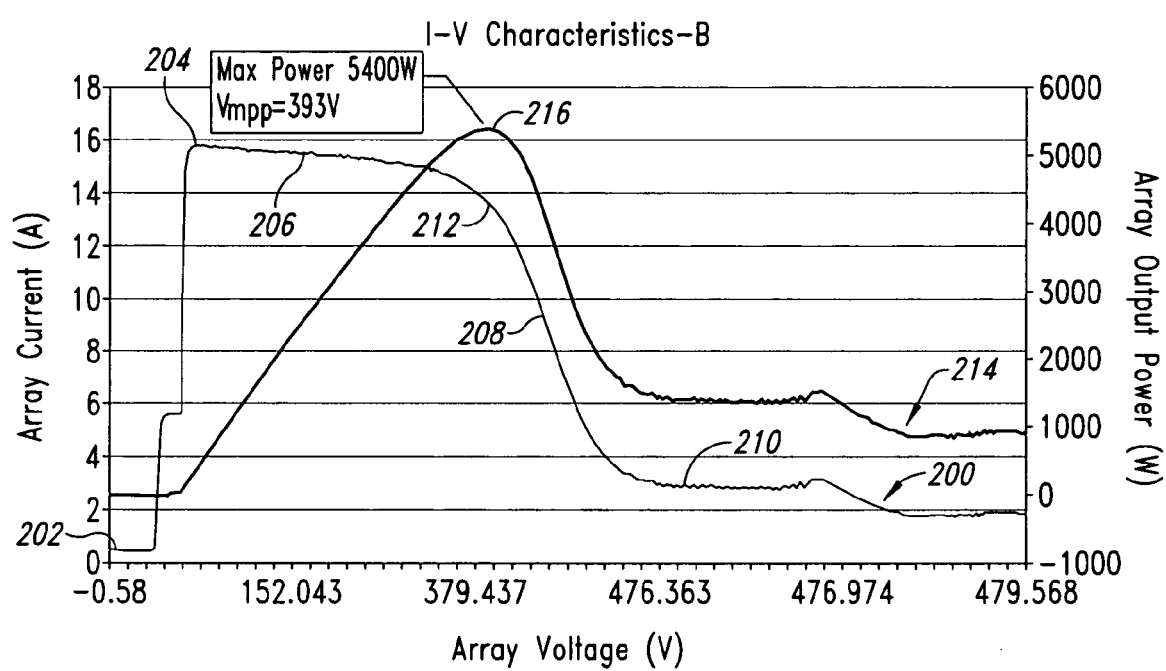
FIG. 2 is an example graph of current versus voltage, and of power versus voltage, usable for determining the MPP in accordance with an embodiment.

Operation of the system 100 to determine the MPP is further illustrated by examining the graphs of FIG. 2 in conjunction with the schematic block diagram of FIG. 1. In FIG. 2, the graphs are shown along with example values for current, voltage, and power. It is understood that these values are provided merely for purposes of illustration and explanation, and are not intended to be restrictive. Moreover, the graphs of FIG. 2 may not necessarily be drawn to scale.

A first graph 200 illustrates current (on the y-axis) versus voltage (on the x-axis) based on values as determined by the current sensor 116 and the voltage sensor 118, respectively. The I-V curve of the graph 200 thus represents the true characteristics of the photovoltaic array 104.

Starting from the lower left region of the graph 200 at 202, the initial value of the current through the capacitor 124 is zero and the initial value of the voltage across the capacitor 124 is zero. This condition corresponds to when the switch 114 is open, and the capacitor 124 has discharged to zero volts by way of the resistor 126. At 202, the photovoltaic array 104 is charging or is at least partially (or fully) charged.

At 204, the switch 114 is closed, such as by the installer or user when beginning the process to determine the MPP. The closing of the switch 116 results in a substantially instantaneous jump in current from zero to approximately 15.8 A at 204. Because the photovoltaic array 104 operates as a current source, rather than a voltage source, this short circuit current (Isc) at 204 will not be of infinite value, thereby avoiding any undesirable over-current condition.

Substantially most of the short circuit current Ise at 204 is drawn by the capacitor 124, since the resistor 126 has a higher resistance. As the capacitor 124 is progressively charged by this current, the current begins to decrease, as shown at 206 and 208 in the graph 200. When the capacitor 124 becomes fully charged at 210 (at approximately 476V), the current has substantially decayed to or near zero. Hence, 476V is the open circuit voltage Voc of the capacitor 124. A point of inflection 212, tangent (tan)=1, or other identifiable transition point on the graph 200 corresponds to a value of current (Impp) and voltage (Vmpp) at the MPP. Because the current is decreasing as the capacitor 124 charges, the value of Impp will be less than the value of Isc.

In an embodiment, the determined values of current and voltage (taken when the switch 114 is first closed, while the capacitor 124 is charging, and when the capacitor is fully charged) are received by the controller 112, and provided to the software 122. From these determined values, the software 122 can determine the power characteristics (represented by a second graph 214 in FIG. 2) of the photovoltaic array 104 by, for example, multiplying the instantaneously determined currents and voltages together. In another embodiment, the power characteristics can be obtained by the software 122 via use of one or more lookup tables that correlate current and voltage with power values, rather than explicitly performing the mathematical multiplication operation.

A maximum calculated power value at 216 corresponds to the MPP. In the example of FIG. 2, the MPP occurs at approximately 13.7 A and 393V, which results in 5400 W at the MPP. According to an embodiment, the controller 112 determines the MPP by reviewing all of the calculated power values obtained by the software, and selects the highest calculated power value as the MPP.

The determined MPP (as well as the corresponding Impp and Vmpp values) are provided to the installer or user, such as by presenting the MPP (and/or Impp and Vmpp values) on a display screen (not shown) or other suitable indicator. The installer and/or user can subsequently use the determined value of the MPP in a number of ways.

For example in an embodiment, after the I-V data is collected, the inverter 102 is connected to the grid 108, and a maximum power point tracking (MPPT) algorithm of the system 100 will search for the maximum power and export that power to the grid 108. By comparing the maximum power available from the photovoltaic array 104 (as obtained by an embodiment of the MPP determination technique described herein) versus the power extracted by the inverter 102, the accuracy and/or efficiency of the MPPT algorithm can be evaluated.

That is, for instance, an embodiment of the MPP algorithm can accurately track changes in the MPP. However, the efficiency and accuracy of the MPPT algorithm can be further improved if the baseline MPP value used by the MPPT algorithm precisely reflects the actual MPP of the photovoltaic array 102. The MPPT algorithm may be less efficient or accurate, for instance, if the baseline MPP used by the MPPT algorithm is only 90% of the MPP. With an embodiment described herein, a precise MPP can be calculated and then subsequently provided to the MPPT algorithm, thereby improving the efficiency and accuracy of the MPPT algorithm, as well as being usable to verify that the MPPT algorithm is operating properly.

Example embodiments of MPP tracking techniques, algorithms, and circuitry are described in further detail in U.S. Provisional Patent Application Ser. No. 60/467,332, entitled "MAXIMUM POWER POINT TRACKING TECHNIQUE FOR A GRID-LINK PHOTOVOLTAIC INVERTER," and filed May 2, 2003; U.S. Provisional Patent Application Ser. No. 60/470,321, entitled "METHOD AND APPARATUS FOR TRACKING MAXIMUM POWER POINT FOR A GRID-LINKED PHOTOVOLTAIC INVERTER," and filed May 12, 2003; and in U.S. patent application Ser. No. 10/836,631, entitled "METHOD AND APPARATUS FOR TRACKING MAXIMUM POWER POINT FOR INVERTER, FOR EXAMPLE, IN PHOTOVOLTAIC APPLICATIONS," filed Apr. 30, 2004, all of which are assigned to the same assignee as the present application. These applications are incorporated herein by reference in their entirety, and for the sake of brevity, their disclosures are not duplicated herein.

There are other illustrative uses of the determined MPP. After obtaining the calculated MPP, the installer or user can compare the calculated MPP with the MPP data provided by the manufacturer. Noticeable differences between the calculated MPP and the expected MPP from the manufacturer can be indicative of a defective or malfunctioning photovoltaic array 104 and/or improper installation, for instance. The calculated MPP can also be used as an indicator of an amount of tuning or adjustment that needs to be performed by the installer and/or user so as to operate the photovoltaic array 104 at or near the MPP.

Figure 3:
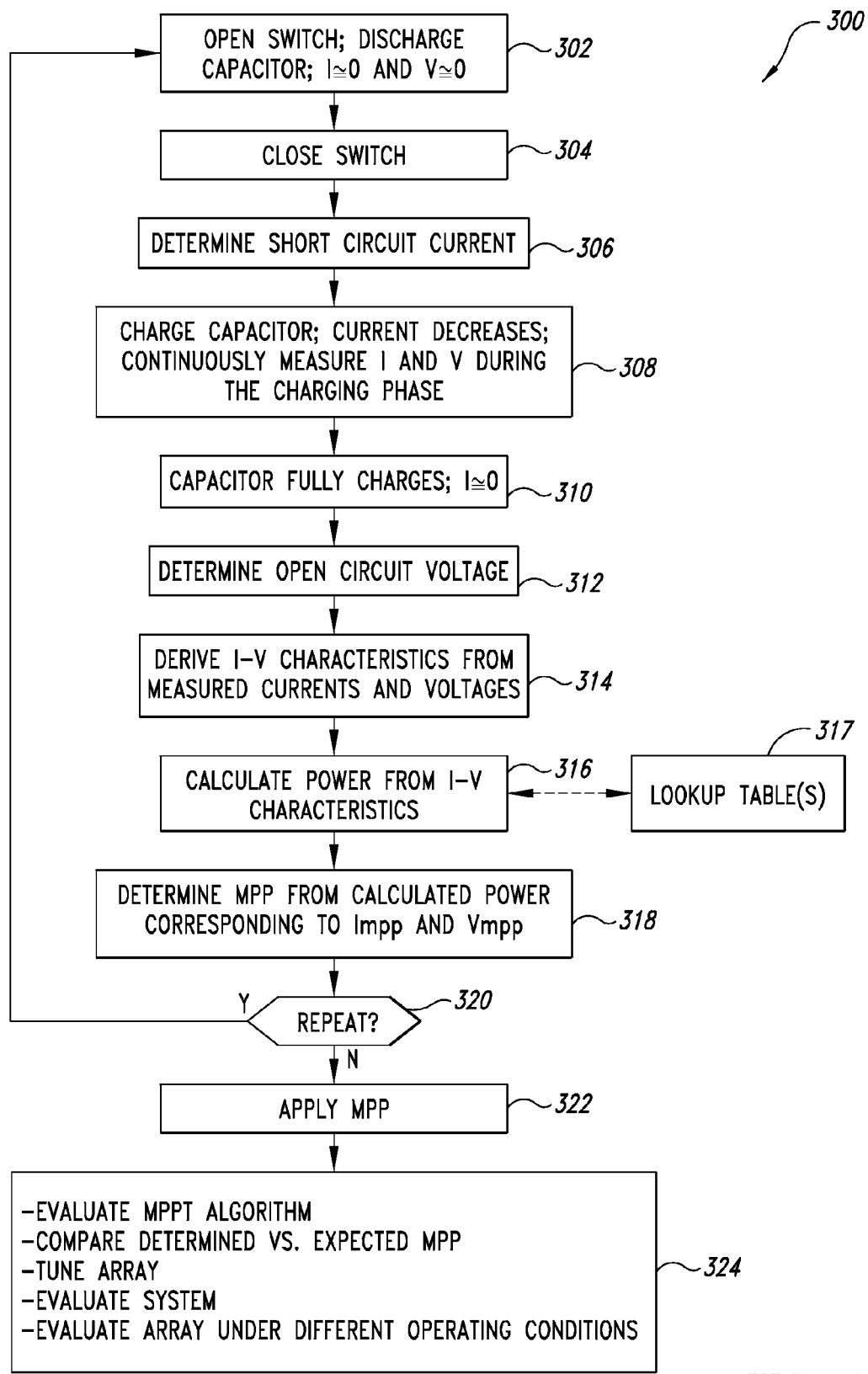
FIG. 3 is a flowchart illustrating an embodiment of a technique for determining MPP that can be used by the system of FIG. 1.

A flowchart 300 of FIG. 3 illustrates an embodiment of a technique to determine the MPP. At least some of the operations depicted in the flowchart 300 can be embodied in or performed by software or other machine-readable instructions stored on a machine-readable medium, such as the software 122 stored on the storage medium 120 and executable by the controller 112. It is understood that the various operations depicted in the flowchart 300 need not necessarily occur in the exact order shown, and that certain operations can be added, removed, combined, or modified.

At a block 302, the switch 114 is open. Therefore, any charges present in the capacitor 124 are discharged by the resistor 126. The photovoltaic array 104 may charge, if needed, while the switch 114 is open at the block 302 or may be charged at some other time. The current from and the voltage across the photovoltaic array 104 are substantially at zero.

At a block 304, the switch 114 is closed. For instance, the installer or user may close the switch 104 to initiate the MPP determination process. In response to the closing of the switch 104, the maximum current (short circuit current) from the photovoltaic array 104 is produced, and this current is measured or otherwise determined at a block 306. Most of this short circuit current is absorbed by the capacitor 124.

At a block 308, the capacitor 124 is charged by the current. As a result, the current across the capacitor progressively increases, while the current progressively decreases. The current and voltage values are continuously measured or otherwise determined at the block 308 by the current sensor 116 and the voltage sensor 118, respectively, during the charging phase of the capacitor 124. Any suitable number of measurements may be taken at the block 308. A relatively higher number of measurements results in a more accurate plot of the I-V characteristics of the photovoltaic array 104.

The capacitor 124 fully charges at a block 310. As the capacitor reaches this fully charged state, the current decays to substantially zero. At a block 310, the open circuit voltage across the capacitor 124 is measured or otherwise determined by the voltage sensor 118.

The determined values of the currents and voltages from the blocks 302–312 are provided to the controller 112. The controller 112 cooperates with the software 122 at a block 314 to derive the I-V characteristics of the photovoltaic array 104 from the measured or otherwise determined currents and voltages.

At a block 316, the power characteristics of the photovoltaic array 104 can be calculated from the I-V characteristics, by multiplying the determined current and voltage values to obtain a set of power values, for instance. As previously explained above for another embodiment, the power characteristicmay be obtained using one or more lookup tables that correlate current and voltage with power values. The use of the lookup table(s) is shown at a block 317 in FIG. 3. From the set of power values, the highest power value is selected as the MPP at a block 318. This MPP corresponds to a particular Impp and Vmpp.

After obtaining the MPP, the installer and/or user may wish to repeat the MPP determination at a block 320. For example, the installer and/or user may wish to verify the accuracy of the calculated MPP by comparing multiple calculated MPPs. If repeated measurements are desired, then the process described above repeats, beginning at the block 302 wherein the switch 114 is opened to allow the capacitor 124 to discharge to zero volts via the resistor 126, thereby initializing the system 100 for new MPP readings. The photovoltaic array 104 may still be substantially charged when the process is repeated, and therefore, additional time need not necessarily be allocated to allow the photovoltaic array 104 to recharge.

At a block 322, the installer and/or user and/or the system 100 may then apply the determined MPP as appropriate. As described above and shown in more detail in a block 324, this application can involve evaluating the accuracy and efficiency of an MPPT algorithm, determining whether the system 100 is operating properly, tuning the system 100 to operate at the MPP, or other uses (including but not limited to comparing the determined MPP with an expected MPP, tuning the photovoltaic array 104, evaluating a performance of the system 100 comprising the photovoltaic array 104 and the inverter 102, evaluating performance of the photovoltaic array 104 under different operating conditions and/or other uses previously described above and elsewhere in this specification).

It is noted that in the preceding description of the embodiments, the MPP determination has been performed based at least in part on the opening and closing the switch 114. In another embodiment, MPP determination can be performed based at least in part on the opening and closing of one or more switches 113 that are in the inverter 102. Examples of one or more of the switches 113 that can be used in conjunction with MPP determination are encircled in FIG. 1.

It can thus be seen that an embodiment of the MPP determination technique allows performance of the system 100 to be proofed. The performance of the inverter 102 against the photovoltaic array 104, for example, can be evaluated to address any possible concerns about the proper functioning or installation of the system 100. Moreover, an embodiment of the MPP determination technique is independent of photovoltaic cell technology, and allows differences in photovoltaic cell technologies under different operating conditions to be identified with respect to MPP behavior.

One embodiment allows identification of any defective strings in a photovoltaic array, such as strings in which a short circuit may have occurred, for example, and/or which may have been by-passed due to malfunctions, as another example. Since photovoltaic arrays age with life, one embodiment allows the user to identify aging-related problems by comparing annual or seasonal MPP values.

The above description of illustrated embodiments, including what is described in the Abstract, is not intended to be exhaustive or to limit the invention to the precise forms disclosed. While specific embodiments and examplses are described herein for illustrative purposes, various equivalent modifications are possible within the scope of the invention and can be made without deviating from the spirit and scope of the invention.

For instance, the foregoing detailed description has set forth various embodiments of the devices and/or processes via the use of block diagrams, schematics, and examples. Insofar as such block diagrams, schematics and examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

As another example, embodiments have been described above in the context of the software 122 performing calculations of power by multiplying values of the determined currents and voltages, and then determining the MPP from the calculated power values. In another embodiment, a technique can be provided wherein the software 122 graphically renders the I-V characteristic curve and/or the power curve (such as depicted by the graphs 200 and 214 in FIG. 2) on a display screen. By visually inspecting these rendered graphs, the installer or user can calculate or otherwise determine the MPP.

In addition, those skilled in the art will appreciate that the mechanisms of taught herein are capable of being distributed as a program product in a variety of forms, and that an illustrative embodiment applies equally regardless of the particular type of signal bearing media used to actually carry out the distribution. Examples of signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

The processes and devices disclosed herein can be used in with sources other than photovoltaic sources. For example, those systems that exhibit significant IV droop characteristics, or other anomalous IV behavior, analogous to that discussed herein can implement an embodiment to determine the MPP.

These and other modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

What is claimed is:

1. A method for determining a maximum power point (MPP) of a photovoltaic array, comprising at least one photovoltaic cell, coupleable to a power inverter by way of a DC bus comprising a capacitor coupled across the DC bus and a switch positioned between the photovoltaic array and an AC bus of the inverter, the method comprising:
closing the switch and obtaining a maximum value of a current substantially provided by the photovoltaic array to the capacitor in response to the closing of the switch;
charging the capacitor with the current to progressively increase a voltage of the capacitor while the current decreases from the maximum value;
obtaining values of the current and the voltage while the capacitor is charging;
obtaining a value of the voltage after the capacitor is charged;
using the obtained maximum value of the current, the values of the current and the voltage while the capacitor is charging, and the value of the voltage after the capacitor is charged to generate I-V characteristics of the photovoltaic array; and
determining the MPP of the photovoltaic array from the generated I-V characteristics.

2. The method of claim 1, further comprising opening the switch to allow the charged capacitor to discharge through a resistor.

3. The method of claim 1 wherein determining the MPP of the photovoltaic array from the generated I-V characteristics comprises:
multiplying values of obtained current by corresponding values of obtained voltages to generate a set of power values; and
selecting a maximum power value from the generated set of power values as the MPP.

4. The method of claim 1 wherein determining the MPP of the photovoltaic array from the generated I-V characteristics comprises:
generating a first graph representative of the I-V characteristics;
generating a second graph, based on the first graph, representative of power behavior of the photovoltaic array; and
determining the MPP from a peak power value represented in the second graph.

5. The method of claim 1, further comprising using the determined MPP to perform any one or combination of: evaluating an efficiency and an accuracy of an MPP tracking (MPPT) algorithm, comparing the determined MPP with an expected MPP, tuning the photovoltaic array, evaluating a performance of a system comprising the photovoltaic array and the inverter, and evaluating performance of the photovoltaic array under different operating conditions.

6. A method of determining a maximum power point (MPP) of an energy source, the method comprising:
determining current and voltage values associated with a capacitor under short circuit and open circuit conditions;
determining current and voltage values associated with the capacitor while a charging state of the capacitor is changing; and
using the determined current and voltage values to determine the MPP of the energy source.

7. The method of claim 6 wherein determining the current and voltage values associated with the capacitor under short circuit and open circuit conditions comprises:
with respect to the short circuit condition:
discharging the capacitor;
closing a switch to cause a short circuit current to substantially flow into the capacitor to charge the capacitor; and
determining a value of the short circuit current; and
with respect to the open circuit condition:
reducing current flow into the capacitor to substantially zero as the capacitor becomes fully charged; and
determining a value of a voltage across the capacitor.

8. The method of claim 6 wherein determining the current and voltage values associated with the capacitor while the charging state of the capacitor is changing comprises determining at least one current value and corresponding voltage value while charge on the capacitor is increasing, including determining a current value and a corresponding voltage value associated with the MPP.

9. The method of claim 6 wherein using the determined current and voltage values to determine the MPP of the energy source comprises using the determined current and voltage values to calculate the MPP of a photovoltaic array comprising at least one photovoltaic cell.

10. The method of claim 9 wherein using the determined current and voltage values to calculate the MPP of the photovoltaic array comprises:
multiplying current values by corresponding voltage values to obtain corresponding power values; and
selecting a largest one of the obtained power values as the MPP.

11. The method of claim 9 wherein using the determined current and voltage values to calculate the MPP of the photovoltaic array comprises using the determined current and voltage values to generate I-V characteristics of the photovoltaic array and determining the MPP from the I-V characteristics.

12. An article of manufacture usable with a photovoltaic array, comprising at least one photovoltaic cell, coupleable to a power inverter by way of a DC bus comprising a capacitor coupled across the DC bus and a switch positioned between the photovoltaic array and an AC bus of the inverter, the article of manufacture comprising:
a machine-readable medium comprising instructions stored thereon to cause a processor to determine a maximum power point (MPP) associated with the photovoltaic array, by:
obtaining a maximum value of a current provided by the photovoltaic array substantially to the capacitor in response to a closing of the switch in a short circuit condition, the current charging the capacitor to progressively increase a voltage of the capacitor while the current decreases from the maximum value;
obtaining values of the current and the voltage while the capacitor is charging;
obtaining a value of the voltage in an open circuit condition after the capacitor is charged;
using at least some of the obtained values of the current and the voltage to generate I-V characteristics of the photovoltaic array; and
determining the MPP of the photovoltaic array from the generated I-V characteristics.

13. The article of manufacture of claim 12 wherein the machine-readable medium further comprises instructions stored thereon to cause the processor to determine the MPP by initializing determination of the MPP by discharging the capacitor.

14. The article of manufacture of claim 12 wherein the instructions to cause the processor to determine the MPP by determining the MPP from the generated I-V characteristics comprise instructions to cause the processor to determine the MPP, by:
    multiplying obtained current values by corresponding obtained voltage values to generate respective power values; and
    selecting a largest one of the generated power values as the MPP.

15. The article of manufacture of claim 12 wherein the switch is coupled externally to the inverter between the photovoltaic array and the inverter.

16. The article of manufacture of claim 12 wherein the switch comprises at least one switch in the inverter.

17. A system, comprising:
    a means for determining current and voltage values associated with a capacitor under short circuit and open circuit conditions;
    a means for determining current and voltage values associated with the capacitor associated with a charging state of the capacitor; and
    a means for using the determined current and voltage values to determine a maximum power point (MPP) of a photovoltaic source.

18. The system of claim 17 wherein the means for using the determined current and voltage values to determine the MPP of the photovoltaic source comprises a means for determining an MPP of an individual photovoltaic cell.

19. The system of claim 17 wherein the means for using the determined current and voltage values to determine the MPP of the photovoltaic source comprises a means for determining an MPP of an array of photovoltaic cells.

20. The system of claim 17, further comprising a means for discharging the capacitor to allow initialization of MPP determination.

21. The system of claim 17 wherein the means for using the determined current and voltage values to determine the MPP of the photovoltaic source comprises a processor means and software means to calculate the MPP by multiplying determined current values with determined voltage values to obtain power values and selecting a largest one of the power values as the MPP.

22. The system of claim 17, further comprising a means for exporting power from the photovoltaic source to a load.

23. A system, comprising:
    a photovoltaic array comprising at least one photovoltaic cell;
    an inverter to invert DC power from the photovoltaic array into AC power;
    a DC bus to couple the photovoltaic array to the inverter;
    a capacitor coupled across the DC bus;
    a current sensor coupled to the DC bus to determine current associated with the photovoltaic array;
    a voltage sensor coupled to the DC bus to determine voltage associated with the photovoltaic array;
    a controller to determine a maximum power point (MPP) of the photovoltaic array using current and voltage values respectively provided by the current sensor and the voltage sensor, the current and voltage values representing I-V characteristics of the photovoltaic array with the capacitor as a load; and
    a switch coupled between the photovoltaic array and an AC bus of the inverter to operatively connect and disconnect the photovoltaic array from the inverter, wherein if the switch is closed, the current values comprise a value of short circuit current supplied substantially to the capacitor by the photovoltaic array and a value of the charging current supplied substantially to the capacitor by the photovoltaic array to charge the capacitor at the MPP, and wherein the voltage values comprise a voltage value across the charging capacitor at the MPP and a voltage value across the capacitor fully charged.

24. The system of claim 23 wherein the switch is coupled externally to the inverter between the photovoltaic array and the inverter.

25. The system of claim 23 wherein the switch comprises at least one switch in the inverter.

26. The system of claim 23, further comprising a resistor coupled to the capacitor through which to discharge the capacitor.

* * * * *